Oct. 4, 1955 H. C. LEHDE 2,719,930
VOLTAGE FUNCTION GENERATOR
Filed May 5, 1951 2 Sheets-Sheet 1
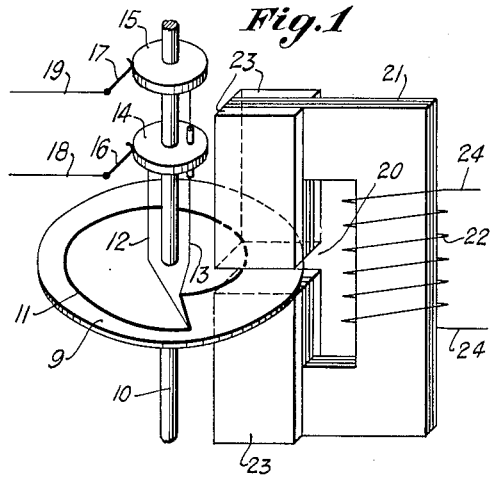
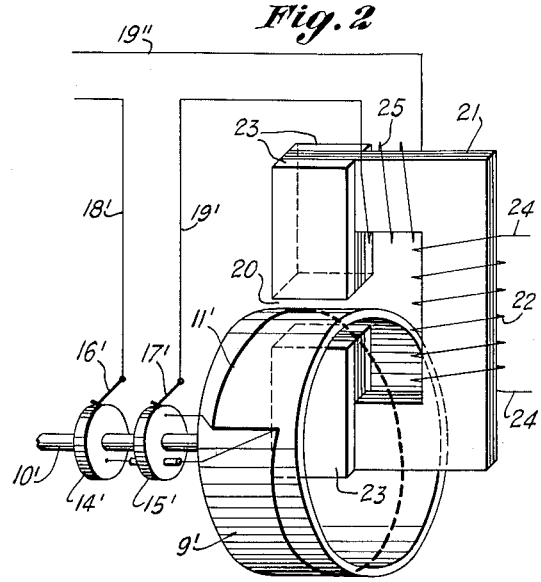
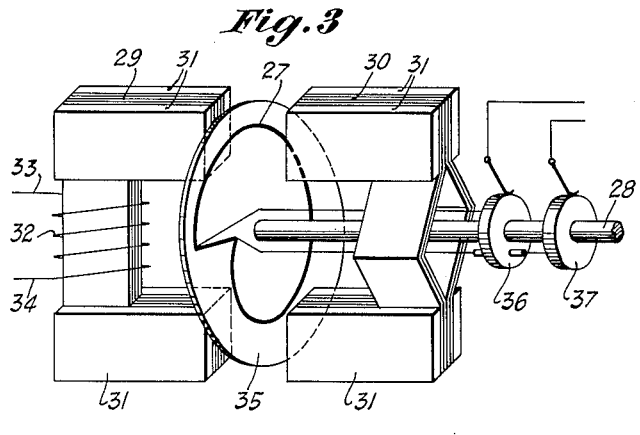
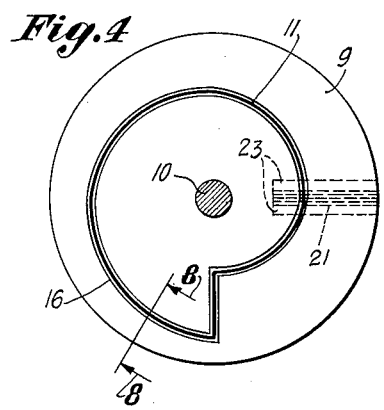
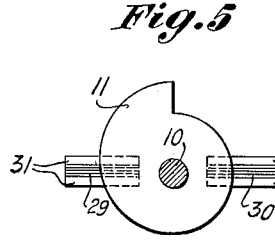
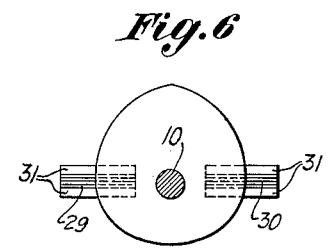
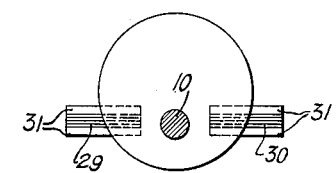
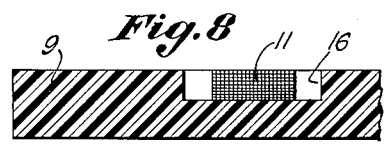
INVENTOR.
Henry C. Lehde,
BY Edward L. Mueller
ATTORNEY.

Oct. 4, 1955 H. C. LEHDE 2,719,930
VOLTAGE FUNCTION GENERATOR
Filed May 5, 1951 2 Sheets-Sheet 2
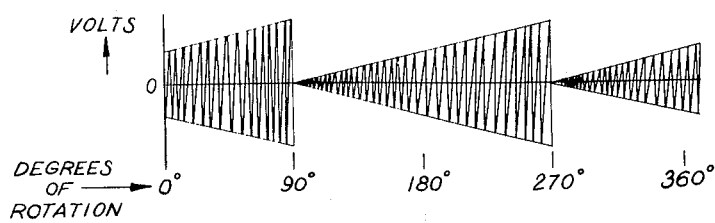
Fig. 9
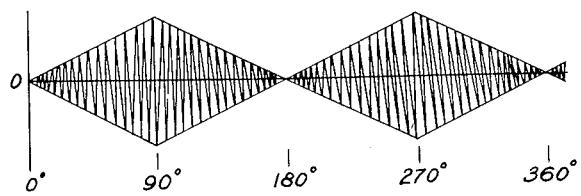
Fig. 10
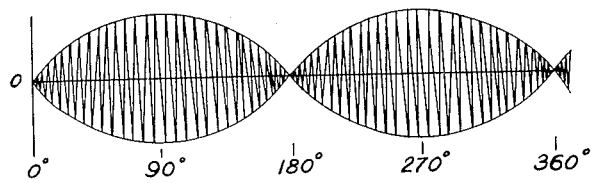
Fig. 11
Fig. 12
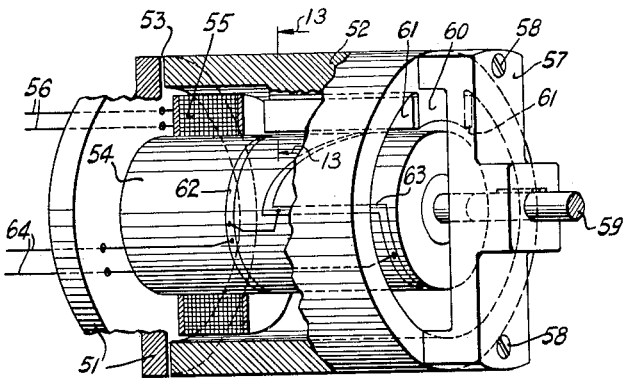
Fig. 13
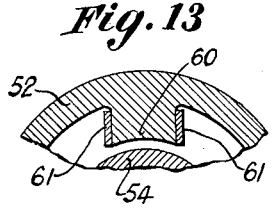
INVENTOR.
Henry C. Lehde,
BY
ATTORNEY.

United States Patent Office 2,719,930
Patented Oct. 4, 1955

2,719,930

VOLTAGE FUNCTION GENERATOR

Henry C. Lehde, Brooklyn, N. Y., assignor to Control Instrument Company, Inc., Brooklyn, N. Y., a corporation of New York Application May 5, 1951, Serial No. 224,730

6 Claims. (Cl. 310—111)

This invention relates to improvements in voltage generators and has particular reference to a method and means for producing a voltage whose magnitude is a unique function of a mechanically contrived position, this application being a continuation-in-part of my copending application, filed January 31, 1950, Serial No. 141,551, now abandoned.

In general, such devices, as above mentioned, are employed in indicating, regulating, controlling and computing mechanisms and usually comprise some form of potentiometer or self-synchronous generator which has been modified to produce a desired voltage magnitude which is a function of shaft position. The design of such units is usually expensive and difficult to attain, and this invention proposes a simple and inexpensive form of a voltage generator in which any arbitrarily assigned voltage may be readily produced as a function of displacement.

It is therefore an object of this invention to secure a perfectly smooth and continuous variation in voltage in accordance with any desired function of displacement.

Another object is to secure a very accurate voltage whose magnitude at any given instant is arbitrarily related to the angular position of a rotative element.

Another object of this invention is to secure a repetitive voltage whose wave form and period may be arbitrarily determined in response to the angular position of a rotative element.

Another object of this invention is to provide a means for adjusting any inaccuracies in the desired voltage by a simple expedient not requiring the re-making of the device.

These and other objects will appear more clearly from the following detailed description when taken in connection with the accompanying drawings; but it is to be expressly understood that said drawings are employed merely to facilitate the description of the invention as a whole and not to define the limits thereof, reference being had to the appended claims for this purpose.

In the drawings:

Fig. 1 is a schematic representation showing one form of the invention;

Fig. 2 is a similar view of another form of the invention;

Fig. 3 is a similar view of a third form of the invention;

Fig. 4 is a schematic plan view, partly in section, of the coil structure employed;

Figs. 5, 6 and 7 are outline views of some of the various coil configurations which may be employed to generate specific voltage functions;

Fig. 8 is a section along the line 8—8 of Fig. 4 showing the position of the coil in its support;

Figs. 9, 10 and 11 are diagrams illustrating the wave forms of the voltages produced by the coils of Figs. 5, 6 and 7, respectively;

Fig. 12 is a similar view showing still another form of the invention in which the desired voltage function is obtained by rotation of only a portion of the primary voltage inducing structure; and Fig. 13 is a section substantially on the line 13—13 of Fig. 12.

As shown in Fig. 1, a disc 9 of insulating material is mounted on a shaft 10. A continuous groove is cut in one face of the disc 9, and a coil of wire 11 formed to fit the groove is placed therein. The shape of the groove is determined by the particular voltage sequence or wave form envelope desired in response to the angular position of the shaft 10. For a voltage which increases linearly with shaft rotation, so as to produce what is commonly called a "saw tooth voltage," the groove, and the shape of the coil lying therein, will take the form of a uniform spiral.

The terminals of the coil 11 are, by means of the leads 12 and 13, connected to a pair of slip rings 14 and 15 from whence, by way of the brushes 16 and 17 and the leads 18 and 19, the voltage induced in said coil is made available to an external or utilization circuit (not shown).

One side of the disc 9 extends into the space or air gap 20 of a magnetic structure 21, which structure comprises a stack of rectangular laminations, cut through at one edge to form the gap 20, and provided with a coil 22 wound thereon whose terminals 24 may be connected to an external source (not shown) of alternating current. When properly located, an outer peripheral portion of the disc 9 and part of coil 11 carried thereby will lie in the air gap and in the magnetic field centered directly between the opposed edges of the cut in the laminations 21.

To avoid fringing of the field in gap 20, copper plates 23 are provided on both sides of the gap so that the current induced therein due to leakage and fringing flux will produce an opposing magnetic field tending to drive these fluxes back into the laminations 21, thus restricting the field to the space in the gap.

As the disc 9 is rotated, the edge of the spiral coil 11 will advance into the gap and into the magnetic field included between the pole faces. A voltage will be induced in coil 11, in view of the fact that the voltage applied to the coil 22 is an alternating voltage, regardless of whether or not the disc 9 and consequently the coil 11 is in motion. The magnitude of said induced voltage will be proportional to the number of lines of force linked by the coil, so that the voltage in coil 11 will increase linearly with the rotation of shaft 10 if that coil is a uniform spiral and thus links more and more of the field. When the radial section of the coil which connects the ends of the spiral portion thereof reaches the gap 20 the voltage induced therein will drop to a minimum, and then the voltage will again build up linearly for nearly 360° with further rotation of the shaft.

It will be understood that the voltage generated in the coil 11 is an alternating voltage whose wave form envelope is a function primarily of the angular position of the shaft 10, and not of the velocity with which it moves coil 11 through the alternating magnetic field. While it is true that there is an additional voltage superimposed on the said voltage, which is dependent on the speed at which the coil moves through the magnetic field, this is a source of error of secondary importance, since in most applications speed of the input shaft is relatively low. The speed voltage error can be minimized, if required, by the use of alternating current of higher frequency, since at constant magnetic field strength, the effect is inversely proportional to the frequency.

As shown in Fig. 2 the laminations 21, pole faces 23, coil 22, and other details of the magnetic structure are identical with those shown in Fig. 1. The moving coil structure, however, and the support therefor differ in that the support 9' is a cylinder rather than a disc and the coil 11' is in the form of a uniform helix rather than a uniform spiral. Rotation of the shaft 10' in a counter-clockwise direction, as viewed in Fig. 2, will cause the helical coil 11' to advance into the field which exists in the gap 20 causing a uniform increase in the voltage induced therein as the coil links more and more of the gap flux and this voltage is available from the slip rings 14' and 15' and the brushes 16' and 17'. The magnitude of the minimum voltage output which will occur when the axial section of coil 11' lies in the air gap 20 will depend upon the amount of magnetic flux still linking the remainder of the coil. This may be reduced to zero by adding a coil 25 wound upon the laminations 21 and of a sufficient number of turns to have induced therein a voltage exactly equal to the minimum voltage or residual voltage left in coil 11' when the axial section thereof lies in the air gap 20. If then the lead 19' is connected in series with said coil 25 so that the output voltage is available to the utilization circuits from the leads 18' and 19", phased in such a manner that the voltages oppose, this minimum or residual voltage will be zero and the voltage at any other time will be the algebraic sum of the voltage induced in coil 11' and the voltage induced in coil 25, which is constant.

The coil 25 might also have been applied to the embodiment illustrated in Fig. 1 hereinabove described and connected therein in the same way as above described to reduce the residual voltage between the leads 18 and 19 to zero when the radial section of coil 11 lies in the air gap 20, rather than to a minimum.

In order that the desired voltage function or wave form envelope may be attained with great accuracy, the finite width of the pole pieces, the fringing of the magnetic field, and inaccuracies in the positioning of the wires of the coils 11 and 11' must be compensated for in such a manner that the resulting voltage follows the desired sequence with time. To this end the coil 11, as shown in Fig. 4, is placed in a slot 16 wider than the coil, rather than in a groove, as in Figs. 1 and 2, so that the coil 11 lies within and is spaced from the walls of said slot. If it is found experimentally that the voltage deviates at some angular position of the disc 9 from the magnitude which is required for that angular position, the mechanical means holding the coil in the slot may be removed and wedges of different sizes such as will cause the coil to be displaced either toward or away from the axis of rotation 10 can be inserted so as to decrease or increase the voltage at that position until the required correction is obtained. Similarly, coil 9' may be placed in a slot on the drum 11' and its axial position varied by means of wedges or shims to correct for any deviations from the desired voltage function or wave form envelope which may occur.

Figure 3 illustrates a third embodiment of the generator hereinabove described wherein the generating coil 27 is mounted on shaft 28 and rotated in the air gap between two opposed U-shaped stacks of laminations 29 and 30. Stacks 29 and 30 are provided with copper plates 31 along the outside surface of the pole pieces as in the foregoing embodiments to minimize flux leakage. The stack of laminations 29 has a coil 32 wound thereon provided with terminals 33 and 34 for connection to a source of A. C. current. Stack 30 has no coil wound thereon and is spread apart at the middle of the U to permit the passage therethrough of the shaft 28. Coil 27 is placed in a groove cut in the disc 35 and is composite in form and so arranged that the two voltages induced therein will add algebraically to produce the required voltage wave form envelope. As illustrated, the shape of the coil 27 is partially circular and the remainder of uniform spiral form, such as is illustrated in Fig. 5. At any position of the shaft rotation the circular portion of the coil will be between one pair of opposing pole faces while the spiral portion will be between the other pair and the voltage available at the slip rings 36 and 37 will be the algebraic sum of these two voltages.

When the radial portion of the coil lies between a pair of pole faces, the junction of the circular portion and the spiral portion of the coil lies between the other pair of pole faces, and for any position of the shaft over an angle of 180° a spiral portion of the coil will produce an ever-increasing voltage while the circular portion produces a constant voltage and thus linearly increasing voltage is obtained from the rotation of the coil through 180°. As the radial portion of the coil passes the next pair of pole faces there will be an abrupt drop in the voltage to zero and again a linear increase with rotation of the voltage output at the slip rings 36 and 37. The wave form of the voltage induced in coil 11 has an envelope approximately as illustrated in Fig. 9. Thus a sawtooth voltage whose period corresponds to the time required to turn the shaft 28 through 180° rather than 360° may be produced. If the coil were of the shape shown in Fig. 6 which comprises two uniform and opposed spirals, the voltage wave form envelope produced can readily be shown to be triangular, approximately as illustrated in Fig. 10; and if the coil were circular but eccentrically mounted with respect to its axis of rotation, as shown in Fig. 7, then the voltage output may again readily be shown to be sinusoidal, approximately as illustrated in Fig. 11.

There is no limitation on the degree of irregularity or rate of change of the voltage that may be produced by this device. Any function having a constant repetition rate, regardless of the number of finite discontinuities it may have during a certain period, may be produced by a coil whose construction allows for the positioning of the coil radially from the center of rotation or axially about a center of rotation by a distance corresponding to its instantaneous magnitude for that rotational position.

In the embodiment of Figs. 12 and 13, the magnetic field structure comprises a stationary end disc or plate 51 having concentrically arranged with respect thereto an outer rotatable cylinder 52 made of a magnetic material having high electrical resistivity, such as powdered iron, in order to minimize eddy current effects in the field structure. Said cylinder 52 forms an air gap 53 with said plate 51 and surrounds the inner stationary cylinder 54 so as to combine therewith to form an annular air gap and the latter cylinder is preferably made integral with the end plate 51. In any event both 51 and 52 are made of magnetic material. A primary of field coil 55 is mounted on the cylinder 54 adjacent the end plate 51 and the leads 56 extending from said coil and through said plate are connected to a source of alternating current. At the end of the cylinder 52 remote from said plate 51, a rotatable mounting block 57 of non-magnetic material is attached to said cylinder by screws 58 and keyed or otherwise secured to said block is the input shaft 59 the inner end of which has a bearing in the adjacent end of the stationary inner cylinder 54. Preferably formed integrally with the inner surface of the cylinder 52 so as to be rotatable therewith, is an inwardly projecting portion 60 that extends longitudinally of said cylinder for a portion of its length, with the inner surface of said projection in close proximity to the surface of the cylinder 54 to combine therewith in providing an air gap. Said projection thus forms the movable or control portion of the field structure. Copper plates 61 are attached to the opposed longitudinal sides of said projection 60 to minimize fringing of the magnetic flux at the edges of said projection.

Secondary coils 62 and 63 are disposed in grooves on the stationary cylinder 54, the coil 62 being circular in shape while the coil 63 has a shape dependent upon the voltage function to be generated. To produce a voltage that increases linearly with shaft rotation, said coil 63 will be in the form of a helix. The voltage induced in the circular coil 62 will be constant regardless of the position of the projection 60, while the voltage induced in the function coil 63 will depend upon how much of the flux from said projection links with the latter coil and this, in turn, depends upon the angular position of said projection in the annular air gap. Since stray magnetic leakage across the portion of the air gap not occupied by the projection 60 will always induce an appreciable voltage in the coil 63, the coil 62 is connected in series opposition to the said coil 63 in order to balance out the voltage due to stray flux linkage. Thus, when alternating current is sent through the field coil 55 over the leads 56, the current flux bridges the air gap 53 between the end plate 51 and the cylinder 52 and also bridges the annular gap between the projection 60 and the member 54. Because of the series connection between the coils 62 and 63, the resultant voltage appearing on the output leads 64 connected to said coils will be due only to the flux passing through the projection 60 and linking with the coil 63. The relative number of turns in the coils 62 and 63 is adjusted so that their induced voltages will balance when the voltage induced in the coil 63 is a minimum.

What is claimed is:

1. A device for generating an alternating voltage whose wave form envelope, as a function of shaft position, has an arbitrarily preselected sequence of values, said device comprising an alternating magnetic circuit having an air gap, a rotatable shaft, a cylinder mounted thereon for rotation therewith and lying partly within said air gap, and a coil carried by said cylinder and having a section thereof disposed within said air gap and being axially disposed on said cylinder so that the axial position of every section of said coil corresponds proportionally to the voltage values preselected for said voltage envelope, each of said axial positions being determined independently of any voltage which may be generated by the relative motion between said coil and the magnetic field.

2. A device for generating an alternating voltage whose wave form envelope, as a function of shaft position, has any arbitrarily preselected sequence of values, a stationary primary coil, an alternating current source for energizing said coil, a magnetic structure linking with said coil, a cylindrical stationary secondary coil linking with said magnetic structure and shaped to determine the specific wave form envelope of said function, and means to rotate a portion of said magnetic structure with respect to said secondary coil to thereby produce a change in flux linkage with the latter coil, which change is dependent upon the shape of said coil and is substantially unaffected by the speed of rotation of said magnetic structure.

3. A device for generating an alternating voltage whose waveform envelope, as a function of angular position, varies continuously in amplitude throughout the greater part of a given cycle of rotation, said device comprising an alternating current magnetic circuit having a relatively narrow air gap, a support having a given axis, a coil arranged on said support so that a part of said coil lies in said air gap, and means to create relative rotation between said coil support and said magnetic circuit about said axis, said coil being so arranged on said support that some part of said coil is disposed in said air gap at all times and being so shaped that the axial distance of the part thereof which lies in said air gap varies continuously with the relative angular position of said coil directly in accordance with the desired amplitude variation of said waveform envelope.

4. A device for generating an amplitude-modulated alternating voltage having an arbitrary waveform envelope that varies continuously in amplitude throughout the greater part of a modulation cycle, said device comprising a coil support, alternating magnetic field means having a pole disposed adjacent to said coil support, said pole and said coil support being capable of relative rotation, said coil support having a surface of such configuration that the various portions of it are placed successively in uniform close proximity to said pole during the course of said relative rotation, and a coil mounted on the surface of said coil support having a configuration such that the effective quantity of alternating magnetic flux-linkages between said pole and said coil is at each instant substantially proportional to the corresponding amplitude of the desired waveform envelope, whereby an alternating voltage having said waveform envelope will be produced by virtue of the coil of configuration and independently of any voltage which may be generated by the relative motion between said coil and the magnetic field.

5. A device for generating an alternating voltage having an arbitrary waveform envelope as a function of the rotation of a shaft, said device comprising alternating magnetic field means having a pole, a coil support having a surface disposed adjacent to said pole and surrounding the axis of rotation of said shaft, said coil support and said pole being capable of relative rotation about said axis, said coil support surface being of such configuration that the various portions thereof are placed successively in uniform close proximity to said pole during the course of said relative rotation, and a coil mounted on said coil support surface having a configuration such that the effective quantity of alternating magnetic flux-linkages between said pole and said coil is at each instant substantially proportional to the corresponding amplitude of the desired waveform envelope, whereby an alternating voltage having said waveform envelope will be produced by virtue of the coil configuration and independently of any voltage which may be generated by the relative motion between said coil and the magnetic field.

6. A device for generating an alternating voltage having an arbitrary waveform envelope as a function of the angular position of a rotatable member, said device comprising a rotatable coil support having a flat surface disposed substantially at right angles to the axis of rotation, alternating magnetic field means having a pole disposed adjacent to the flat surface of said coil support, and a coil mounted on the flat surface of said coil support with the axis of rotation passing through said coil, said flat surface being so arranged in relation to said pole that various portions of said surface are placed in uniform close proximity to said pole during the rotation of said coil support, the configuration of said coil being such that the effective quantity of alternating magnetic flux-linkages between said pole and said coil is at each instant substantially proportional to the corresponding amplitude of the desired waveform envelope, whereby an alternating voltage having said waveform envelope will be produced by virtue of the coil configuration and independently of any voltage which may be generated by the relative motion between said coil and the magnetic field.

References Cited in the file of this patent

UNITED STATES PATENTS

| Number | Name | Date |
| --- | --- | --- |
| 447,921 | Tesla | Mar. 10, 1891 |
| 502,777 | Sheldon et al. | Aug. 8, 1893 |
| 526,064 | Wageman | Sept. 18, 1894 |
| 992,817 | Southgate | May 23, 1911 |
| 1,102,990 | Marconi | July 7, 1914 |
| 1,491,108 | Sethman | Apr. 22, 1924 |
| 1,659,071 | Applebaum | Feb. 14, 1928 |
| 1,759,987 | Knapp | May 27, 1930 |
| 1,964,265 | Markley | June 26, 1934 |
| 2,049,232 | Sydnes | July 28, 1936 |

FOREIGN PATENTS

| Number | Country | Date |
| --- | --- | --- |
| 168,743 | Germany | Mar. 14, 1906 |
| 505,806 | Germany | Aug. 27, 1930 |